United States Patent [19]

Lippman et al.

[11] Patent Number: 4,699,485

[45] Date of Patent: Oct. 13, 1987

[54] METHOD AND CAMERA SYSTEM FOR THE INSPECTION OF BOILER TUBES

[76] Inventors: Robert Lippman, 27 Underhill Ave., Syosset, N.Y. 11791; Mel Schachter, 71 Glen Cove Dr., Glen Head, N.Y. 11545

[21] Appl. No.: 717,543

[22] Filed: Mar. 29, 1985

[51] Int. Cl.⁴ ............................................. G03B 37/00
[52] U.S. Cl. ..................................... 354/63; 346/33 P
[58] Field of Search .................. 354/63, 64; 346/33 P, 346/33 WL, 107 W; 358/99, 100

[56] References Cited

U.S. PATENT DOCUMENTS

| | | | |
|---|---|---|---|
| 2,894,436 | 7/1959 | Eber et al. | 354/63 |
| 3,172,344 | 3/1965 | Jackson | 354/63 X |
| 3,244,085 | 4/1966 | Pulfer | 354/63 |
| 3,621,767 | 11/1971 | Hyzer et al. | 354/63 |
| 3,691,819 | 9/1972 | Guest | 346/33 P X |
| 3,832,724 | 8/1974 | Duval | 354/63 |
| 4,131,914 | 12/1978 | Bricmont | 358/100 |

Primary Examiner—William B. Perkey
Attorney, Agent, or Firm—Wyatt, Gerber, Shoup, Scobey and Badie

[57] ABSTRACT

In a fire tube boiler, combustion takes place in elongated boiler tubes, which are subject to corrosion, wear, deposition build-up and color changes. A cylindrical camera body, round in cross-section, is inserted into a still-hot boiler tube. The camera body is cooled by cooling fluid and is pushed along the tube using extension rods. A motion picture film strip, preferably color instant film within a cassette, is advanced by remote control, by the operator, to expose a sequence of film frames on the cassette's film plane, as the camera body is progressed within the tube. The tube is dark so that a camera shutter is not used. Instead, tiny light sources, such as incandescent bulbs and/or a swingable mirror, are used to select the exposure time of the film. A fixed-focus and fixed-distance lens system focuses the images from the tube's inner wall on the film plane.

13 Claims, 10 Drawing Figures

METHOD AND CAMERA SYSTEM FOR THE INSPECTION OF BOILER TUBES

BACKGROUND OF THE INVENTION

The present invention relates to methods and systems for the inspection of the internal walls of the tubes of fire tube boilers.

In general, two types of commercial boilers which are widely used are water tube boilers and fire tube boilers. In water tube boilers the tubes carry water and they are surrounded by combustion within the boiler. In fire tube boilers combustion occurs within the tubes and the tubes are immersed in water.

The tubes of a fire tube boiler are subjected to high heat, which fluctuates and causes stress; the build-up of decomposition products from combustion; and water leakage, should any openings develop. The tube should be inspected to determine if there is excessive build-up of decomposition products or if there is any leakage. In addition, a skilled engineer or operator may be able to determine the flame pattern and if there are problems in the combustion process, by viewing the shape, size and color of the decomposition build-up and the color of the internal tube wall.

In order to replace a leaking boiler tube it is necessary to shut-down the boiler; permit it to cool to room temperature, which may take hours; and cut-out the defective tube and weld a new tube in its place, requiring circular welds at both ends of the tube. That replacement procedure is time-consuming and costly, particularly since it must be done each time a tube develops a serious leak. Since the typical commercial boiler has many tubes, and they receive unequal stress from combustion, the tubes may start to leak in a random and unpredictable manner, requiring frequent boiler shut-downs and repairs.

An alternative to waiting for the tubes to leak before replacing them is to have the tubes inspected, for example, on a monthly schedule, by a boiler inspection service. Sucn an inspection service may utilize an oriented fiber optic bundle to visually inspect the interior wall of the tube. That type of fiber optic system is relatively costly and consequently would be utilized by an inspection service rather than by the boiler operator. In addition, the fiber optic bundle is not heat-resistant, so the boiler must be shut-down and permitted to cool, for many hours, before it may be inspected.

The analysis of the combustion process is especially important when the fuel is a slurry, for example, a coal-water or coal-oil-water slurry. When the boiler is burning a completely combustible fuel, such as natural gas or butane gas, the decomposition build-up is likely to be slow. However, if a coal slurry is incorrectly combusted, the decomposition build-up on the tube wall may be relatively rapid and its analysis may reveal if there are any combustion problems.

OBJECTIVES AND FEATURES OF THE INVENTION

It is an objective of the present invention to provide a method for the inspection of fire tube boilers, and a camera system for such inspection, which method and system will be relatively low in cost, compared to a fiber optic system, and yet will provide accurate and rapid information as to the condition of the inner tube wall and the deposits found on that wall.

It is a further objective of the present invention to provide such a method and system that is relatively simple to utilize so that it may be used by an operator without extensive training and yet will provide rapid and accurate results.

It is a still further objective of the present invention to provide such a method and system that may be used without completely cooling the boiler, thereby decreasing the period during which the boiler is taken out of service.

It is a feature of the present invention to provide a camera system for taking photographs of the interior wall of a tube in a boiler to detemine if the tube is subject to failure and to analyze the combustion which occurred in the tube. The camera system includes a camera body which preferably is liquid cooled and is adapted to slide within the boiler tube, Preferably, a cassette with the camera's body holds a length of photographic film (a plurality of film frames). The cassette has film advance means to advance a frame of film to be exposed each time a picture is taken of the tube wall. The camera body has lens means, to view a portion of the interior tube wall and project an image of the wall on the film frame.

An extension means, preferably a rod assembly, is used to slide the camera body along the length of the boiler tube. Film advance control means, exterior to the tube and connected to the film advance means, selectively controls the advancing of the film. The camera system also includes illuminating means such as "grain-of-wheat" incandescent bulbs to selectively illuminate the boiler tube wall.

It is a further feature of the present invention that a mirror is pivotally mounted within the camera body and the mirror is selectively positionable to be in the optical path between the lens means and the film frame. Preferably, the camera system includes a mirror swing means, such as a solenoid, within the camera body, which selectively pivots the mirror to be within the optical path or blocks the optical path, simultaneously protecting the mirror. Mirror control means, exterior to the boiler tube, selectively controls the operation of the mirror swing means.

It is a still further feature of the present invention that the camera system includes centering and locking means to selectively project from the camera body to center the camera body in the boiler tube as well as "lock" the camera in position and centering and locking control means, external to the tube, to selectively project the centering and locking means outward from the camera body. Preferably, the centering and locking means includes a series of ball elements arranged around the periphery of the camera body and the centering and locking control means includes a solenoid which projects the ball elements outward relatively to the tube axis.

BRIEF DESCRIPTION OF THE DRAWINGS

Other objectives and features of the present invention will be apparent from the following detailed description, taken in conjunction with the accompanying drawings. In the drawings.

DESCRIPTION OF THE INVENTION

Figure 1:
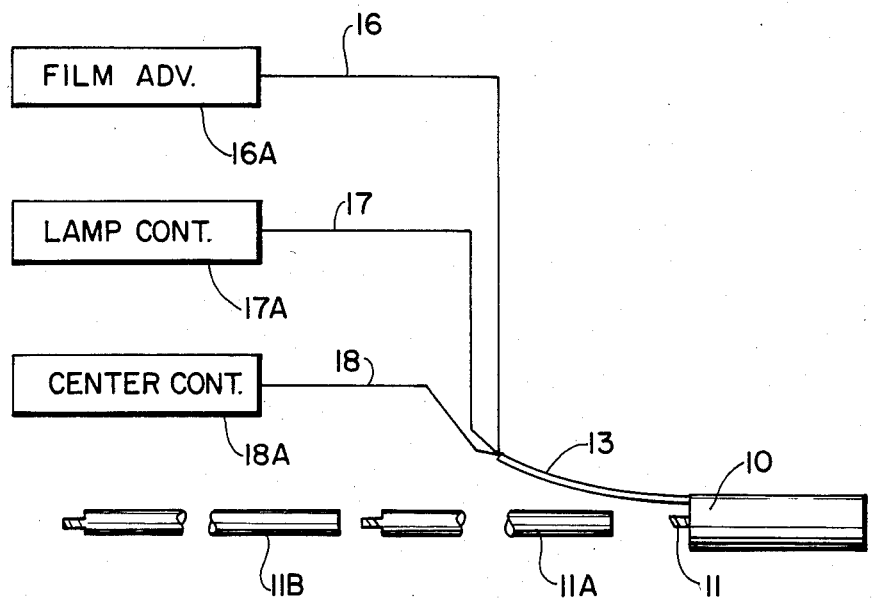
FIG. 1 is a block schematic view of the camera system of the present invention.
Figure 2:
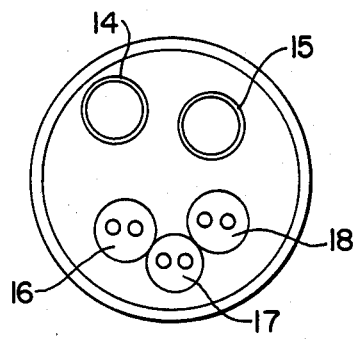
FIG. 2 is an enlarged side cross-sectioned view of the conduit.
Figure 3:
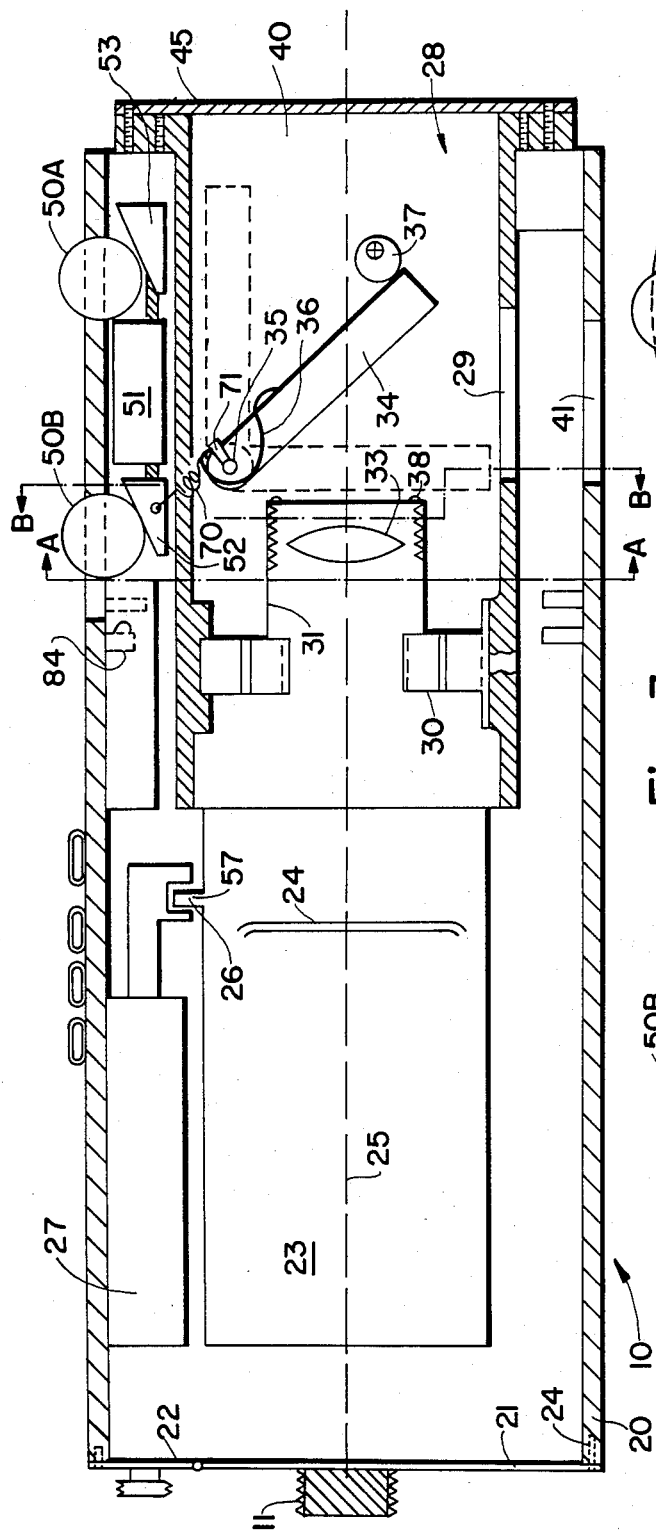
FIG. 3 is a cross-sectional view of the camera body.
Figure 5:
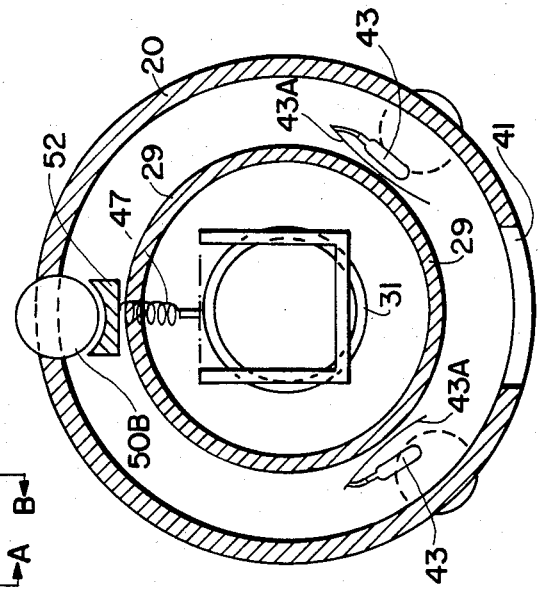
FIG. 5 is a cross-sectional view of the camera body taken along B—B of FIG. 3.
Figure 4:
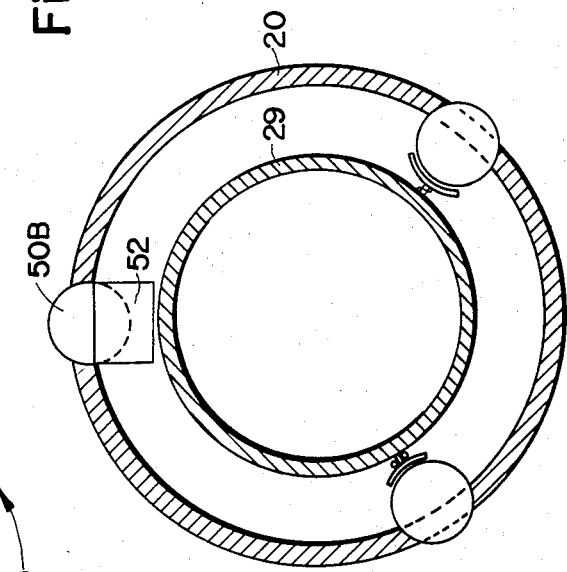
FIG. 4 is a cross-sectional view taken along the line A—A in FIG. 3.

As shown in FIG. 1, the camera system of the present invention includes a camera body 10, whose details are shown in FIGS. 3-5. The camera body 10 is of a size and shape to fit into the standard tubes of fire tube boilers.

As a specific and preferred embodiment the camera body is round in cross-section, seen in a plane perpendicualr to its imaginary central axis. The standard sizes of boiler tubes is either 2 inches or 2.5 inches in diameter. For use in the 2-inch diameter boiler tube, the camera body 10 is preferably 1.625 to 1.875 inches in diameter, and suitably is 1.75 inches in diameter, and is 4.5 inches long. For use in a 2.5 inch diameter boiler tube, the camera body 10 is preferably 2.125 to 2.375 inches in diameter and suitably is 2.25 inches in diameter and is 4.5 inches long. The back end of the camera body is connectable, by screw threaded boss 11, to the extension rod 11A. The boiler tube typically has a length of ten to twenty feet so that the extension rods 11A must be of that length.

The extension rod 11A, preferably two feet in length, round in cross-section, and of aluminum, has a female screw connection at one end and a male screw threaded connection at its opposite end. The rod 11A is screwed onto the similar rod 11B, which in turn is screwed onto similar rods, to form an elongated series of extension rods.

A heat resistant flexible conduit 13, preferably of PTFE (DuPont brand "Teflon") carries two liquid carrying cooling tubes and the electrical control wires.

The cooling liquid, preferably cold tap water, flows to the camera body through tube 14 and is returned through tube 15. The wire pair 16 controls the film advance, the wire pair 17 controls the illuminating image and the wire pair 18 controls the centering and locking device as well as the mirror position. The wire pairs 16–18 terminate in the controls 16A–18A, preferably on a single control panel, which are the film advancing control 16A, lamp control 17A and centering/locking and mirror control 18A.

As shown in FIGS. 3-5 the camera body includes a tubular metal housing 20, which may be constructed of two pieces, bayonetted together for simplicity in construction. A flat metal plate 21 is hinged to the fixed plate 22 which is attached to the housing 20. The door plate 21 is lifted to replace the film cassette 23 and is locked by the recessed hex nut 24. The cassette 23 has a film plate 24 in a plane perpendicular to the imaginary central axis 25 of the camera body. The cassette 23 has a film advancing means 26 which is operated by the solenoid 27 attached to the housing 20. The solenoid 27 is connected to and supported by the wire pair 16.

The forward portion of the camera body 10 includes a tubular case member 29 which is mounted on housing 20 by the front flange 28 (part of 29) by recessed hex head screws 44. A flat metal plate 45 is attached to both the tubular case member 29 and housing 20 by fasteners (screws) 46. This plate 45 protects the hot gases and particles from entering the camera body when using the camera in a side-viewing mode.

A tubular lens mount 31 is attached to case member 29 by ring 30. A focusing lens sytem 33, having a fixed focus (and fixed distance) to the image, is mounted in lens mount 31. A protected front surface mirror 34 is pivotally mounted within the tubular case 29. The mirror 34 is pivoted at pivot 35, spring loaded by spring 36 and normally rests against rubber "O" ring 38 which is attached to lens mount 31. In this position the mirror 34 protects the lens (as well as its surface) from dirt during transport and prevents stray light from reaching the filmplane. The mirror stop 37 is eccentrically adjustable to provide exact positioning. The stop is held in position by spring 47 (FIG. 5) loading and is ramp-shaped so that the stop is retracted into the camera housing 10 when the "Fish-eye" attachment 90 is slipped into place.

A round opening 41 in metal housing 20 (coaxially aligned with the opening in tubular case 29) is exposed to the tube surface. The opening 41 is not covered with glass, as the glass can easily be covered by flaking or depositions from the surface of the boiler tube and once covered cannot easily be cleaned until the camera body 10 is removed from the boiler tube. A series of light sources, i.e., illuminating bulbs 43, are positioned near the opening 41 of the camera body and focused by shields 43a. Preferably, the bulbs 43 are four tiny "grain of wheat" incandescent bulbs positioned around opening 41. The bulbs 43 are lighted, through wire 17, for the amount of time necessary to provide the correct exposure for the film. The camera body does not have a shutter as the boiler tube is normally completely dark.

The camera body is designed to be used in a tube of a specific diameter and has a remotely controlled centering and locking device in order to prevent camera body 10 from moving and at the same time pushing into position the camera body 10 in a specific height above the bottom of the boiler tube. This height is determined by the fixed height roller bearings on the sides of the camera body 10 and must be consistent with the focal distance of the lens system being used. A solenoid 51 has ramps 52 and 53 connected to its respective solenoid arms. When the arms move to the left, the ramps 52,53 force the balls 50A, 50B outwardly.

Figure 7:
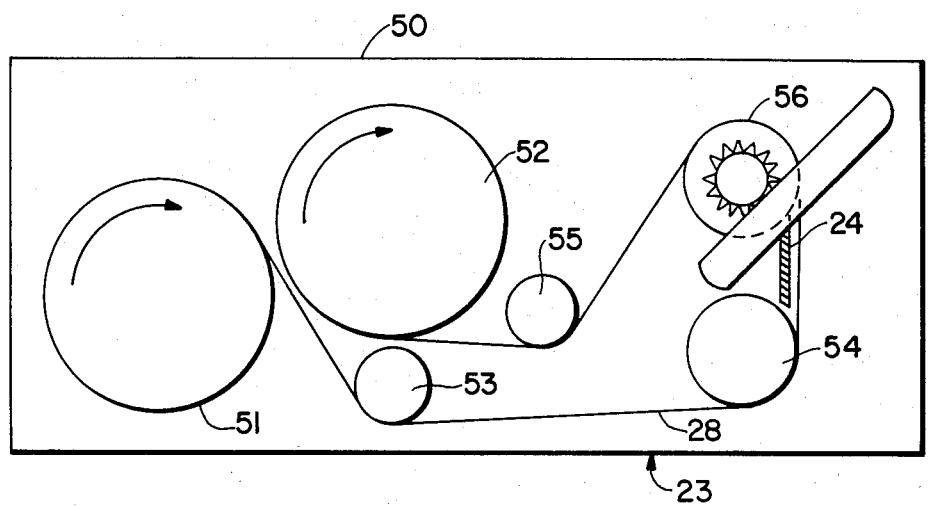
FIG. 7 is a cross-sectional view of the cassette.

As shown in FIG. 7 the cassette 23 includes a housing 50, a rotatable reel 51 for the film supply, a rotatable reel 52 for the film take-up, a series of smooth freely rotatable guide rollers 53–55, and a sprocket gear 56. The sprocket gear 56 has teeth which fit in the holes at the side of the film. Preferably, the film is 8 mm or 16 mm color motion picture film and is preferably of the instantly developing type. A suitable film is available from Polaroid, Cambridge, Mass. The sprocket gear 56 is connected through a gear train (not shown) on top of the cassette, to an advancing arm 57. The arm 57 is pivoted by solenoid 27 to advance the film 58 by a single frame on the film plane 24.

An alternative to the side-viewing embodiment, described below, is to connect a wide angle lens attachment, such as a 180 degree fish-eye lens, to the front face of the camera body 10. Using the Fish-Eye Attachment 90, the mirror is brought to its auxiliary position, shown by the dash-dot lines in FIG. 3, and is held in this position by the Fish-Eye Attachment tube 91. The spring loaded mirror stop 37 is pushed into its housing 47 (FIG. 5). The portion of the stop 37 which comes into contact with the inner tube 91 of the Fish-Eye Attachment 90 is ramped shaped, and therefore easily pushed into its housing 47. This lens system, consisting of the original lens system 33 and the wide angle lens (fish-eye lens) 96, in this embodiment, receives an image, directly in line with axis 25, of a circular band of the tube inner wall. The camera body is advanced along the tube and a photograph is taken every 3 or 4 inches. For example, the photographs are black-and-white and are developed to give an immediate scan of the tube's wall.

Figure 9A:
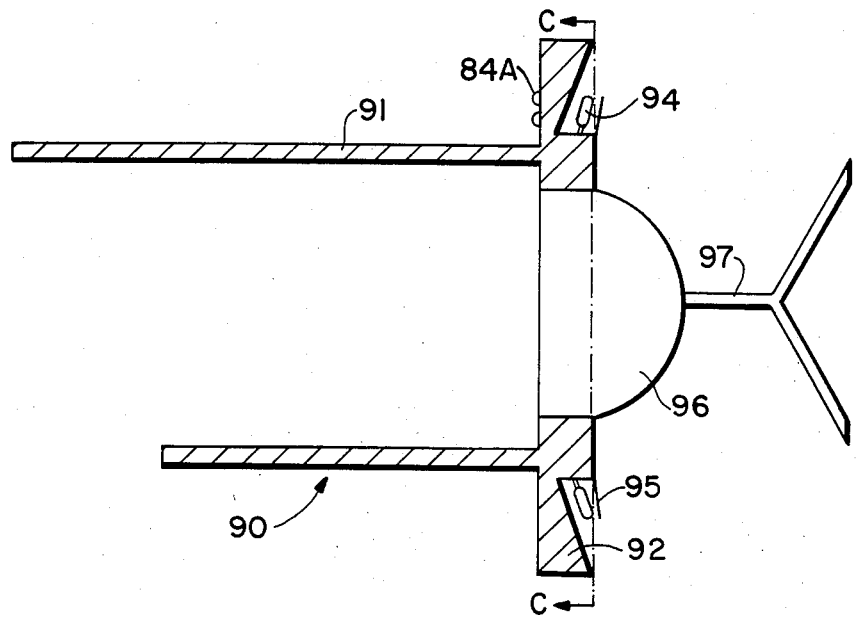
FIGS. 9A and 9B are a series of views of the "Fish-Eye Attachment", with FIG. 9A being a side cross-sectional view and FIG. 9B being a front cross-sectional view taken along line C—C of FIG. 9A, in the direction of the arrows.
Figure 9B:
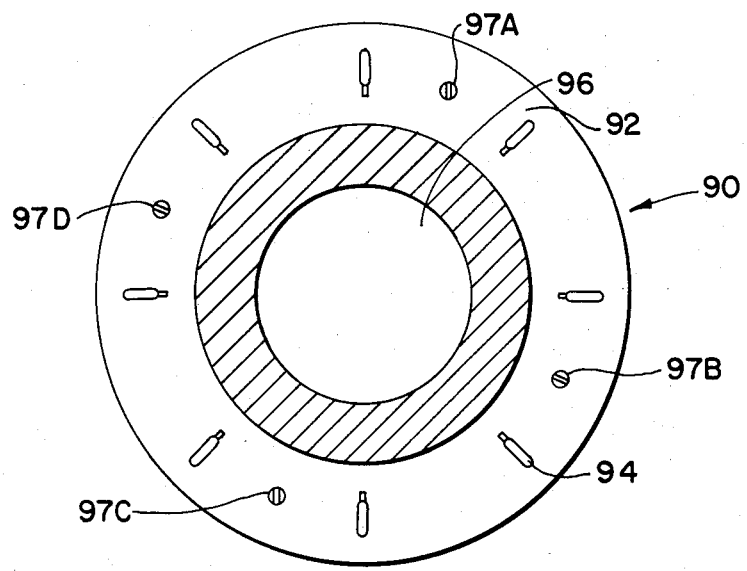

Use of the Fish-Eye Attachment 90 (FIG. 9) is accomplished in the following manner. Plate 45 is unscrewed from the camera body 10. The Fish-Eye Attachment 90 is aligned with the opening in the tubular portion 29 and inserted so that the elongated wall 91 pushes the mirror stop 37 into its housing 47 so that the mirror 34 can move to the position indicated by the dash-dot lines in FIG. 3. The top portion of the tubular wall 91 is flat and designed to protect the mirror; while the bottom portion is designed to seal the opening 41 through which sidewise viewing photographs would be exposed. Flange 92 is secured to camera body 10 by screws 97A-D into threaded openings 46 through flange 28 of tubular case member 29. Light for the photographs is provided by the lamp control means 17A (-FIG. 1) through wire 17 through contacts 83 and 84 (FIG. 6) to contacts 84A on the inner flange of the Fish-Eye Attachment. When the fish eye attachment is not in place these recessed contacts 84 are covered by plate 45 (FIG. 3). FIG. 9 shows the eight incandescent bulbs 94 placed around the flange, in the recessed portion of the flange 93 with the light shield 95 preventing light from directly entering the fish-eye lens 96. Alternatively, a miniature circular fluorescent tube, such as those used in ring stroboscopes, may be used in place of the incandescent bulbs. The fish-eye lens shield 97 is a thin metal shield designed to protect the lens 96 from both hot particles and gases in the tubes. It is attached directly to the lens with a drop of cement (glue).

To take a sidewise viewing photograph, the operator advances the camera body 10 to the desired location within the tube. He then operates center/locking control 18A to center and lock the camera body 10 within the tube and to raise the mirror to its full line position shown in FIG. 3. As shown in FIGS. 3 and 5, solenoid 51 extends the ramp 52 and a spring 70, connected to a fixed arm 71, pulls the fixed arm 71 which is pivotally connected to the mirror 34. Alternatively, and not shown, the centering/locking device and the mirror may be separately controlled, for example, by being operated by solenoids. The operator next advances the film, by operation of film advance means 16A, to bring an unexposed film frame onto the film plane 24. He next operates a switch at lamp control 17A which has an adjustable timer, and turns on the light source (lamps) for the selected time (i.e., the time necessary to provide a properly exposed film frame). That completes the steps for a single sideways viewing photograph. To prepare for the next photograph, the operator operates the centering/locking control means 18A to release the camera body 10 and permit spring 36 to bring the mirror 34 to its rest position against the rubber ring 38, and advances the camera body 10 to its next location.

Modifications may be made in the present invention within the scope of the sub-joined claims. For example, the camera body may have a solenoid controlled scrapper which is selectively protruded from the camera body to scrape decomposition products from the tube wall.

Figure 6:
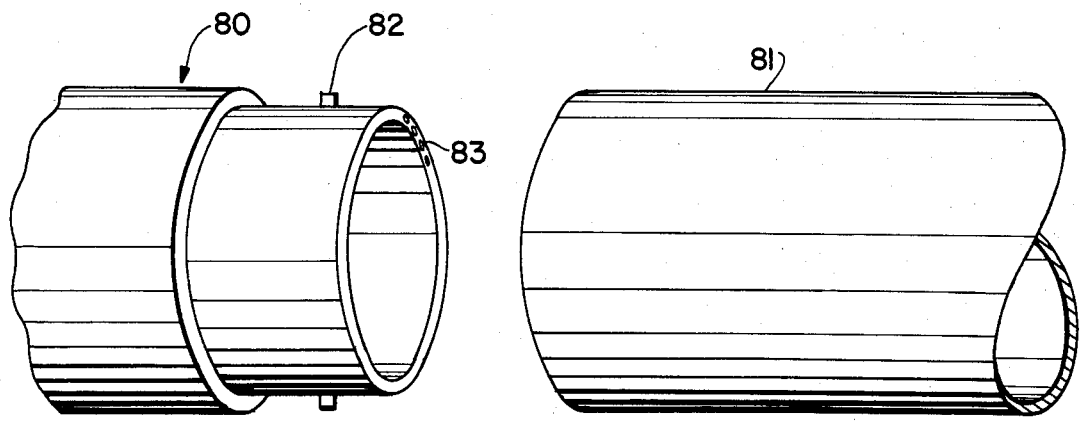
FIG. 6 is a partial perspective view showing two portions of the camera body.
Figure 8:
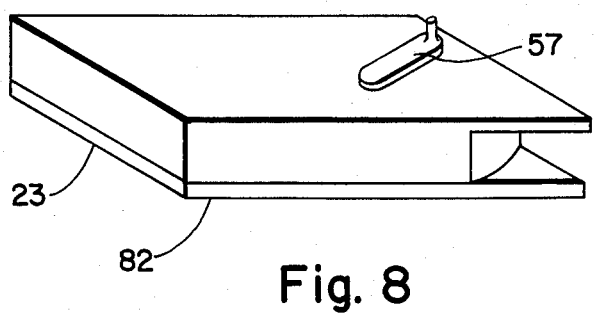
FIG. 8 is a perspective view of the cassette.

The camera body 10 may be constructed in two portions, as shown in FIG. 6. The rear portion 80 contains the film cassette, the lens elements, and the cooling coils. It is attached to the front portion 81 by the locking pins 82 which fit in slot channels (not shown) on the front portion 81. The female electrical contacts 83 on the flange of the rear portion 80 mate with male electrical contacts (not shown) on the corresponding flange of the front portion 81, when the two portions 80,81 are joined. Similar electrical contacts are found at the front flange 84 of the front portion of the camera body 81, to be used with the fish-eye attachment. The cassette, as shown in FIG. 8, has a removable cover 82 to permit the use and replacement of the roll film. Alternatively, and not shown, special cassettes may be fabricated for one-time use. The sequence of the steps may be automated using a simple micro-computer based control system and similarly the advancing of the extension rod may be automated using, for example, a rack-and-gear system.

Another modification would be the use of a series of scrappers around the camera body which may be extended to scrape an entire 360° band of material from the tube. The lamp control may be automated, in place of a timer, using a conventional camera automatic exposure time priority control, so that the exposure of each frame would receive the same pre-selected amount of light. Such an exposure control, instead of controlling a shutter as in a conventional camera, would control the time the lamps are illuminated.

What is claimed is:

1. A camera system for taking photographs of a hot tube in a boiler having an internal wall without cooling the tube, the camera system including: a camera body adapted to slide within the boiler tube; a cassette means within said camera's body to hold a length of photographic film, the film comprising a plurality of film frames; film advance means associated with said cassette means to advance a frame of film to be exposed; lens means mounted on said camera body to view a portion of said internal wall of the boiler tube; film control means exterior to said boiler tube and connected to said film advance means to selectively control the advancing of the film, illuminating means to selectively illuminate the boiler tube wall portion and expose said frame of film, said illuminating means including a light source mounted on said camera body and light control means exterior to said boiler tube to control the lighting of said light source; centering means to selectively project from said camera body and center the position of the camera body in the boiler tube, centering control means external to said boiler tube to selectively project the centering means, and liquid flow tubes connected to said camera body and adapted to carry cooling fluid from outside of said boiler tube to cool said camera body.

2. A camera system as in claim 1 wherein said camera body has an imaginary central axis, the camera body is round in cross-section in a plane perpendicular to said camera body central axis, the lens means is orientated to view along said camera body central axis and the cassette means has a film plane upon which said film frame is held for exposure, the said film plane being in a plane perpendicular to said camera body central axis.

3. A camera system as in claim 1 wherein said centering means includes a series of ball elements arranged around the periphery of the camera body and said centering control means includes a solenoid to project at least one of the ball elements outward relative to the camera body.

4. A camera system as in claim 1 wherein said camera body has an imaginary central axis and is round in cross-section in a plane perpendicular to said axis.

5. A camera system as in claim 1 wherein said film advance means includes a solenoid mounted within said camera body.

6. A camera system as in claim 1 and further including a mirror pivotally mounted within said camera body and selectively positionable to be in the optical path between said lens means and said tube.

7. A camera system as in claim 6 and further including mirror swing means within said camera body to swing said mirror so that said mirror is either within said optical or blocking said optical path, and mirror control means exterior to said boiler tube to selectively control the operation of said mirror swing means.

8. A camera system as in claim 7 wherein said mirror swing means includes a solenoid.

9. A camera system as in claim 1 wherein said cassette means includes a cassette having a rotatable film supply reel, a rotatable film take-up reel, and a driving sprocket gear which is rotated by said film advance means.

10. A method of inspecting the hot wall of a boiler tube having an internal wall without cooling the tube and removing the tube from the boiler, the method including the steps of:

sliding a camera body along the internal wall of the tube by pushing on an extension rod connected to the camera body;

cooling the camera body by flowing cooling liquid through liquid flow tubes connected to said camera body;

centering the camera body within the tube using centering means which are selectively projected from said camera body by operating centering control means external to said boiler tube prior to each time a photograph is taken;

using a lens system within the camera body to focus the image of a portion of the internal tube wall on a frame of an elongated photographic film strip, which frame is positioned for exposure on the film plane of a film cassette;

operating a film advance means associated with the cassette and within the camera body by selectively operating said film advance means from outside of the tube, to advance the film strip so that a series of photographs along the tube are taken;

selectively operating, from outside the tube, an illuminating means mounted on said camera body to light the interior of said tube when said photographs are being taken; and developing the exposed film strip and analyzing the tube internal wall by inspection of the developed photographs.

11. The method of inspection of claim 10 wherein said camera body has an imaginary central axis and is round in cross-section in a plane perpendicular to said axis.

12. A method of inspection as in claim 10 and including the further step of selectively, from outside the tube, pivoting a mirror pivotally mounted within said camera body and selectively positionable to be in the optical path between said lens means and said tube.

13. A method of inspection as in claim 10 wherein said film motion picture film and the development is instant development.

* * * * *